United States Patent
Nichols-Roy

Patent Number: 5,975,125
Date of Patent: Nov. 2, 1999

[54] COMBINED FILTER AND NOISE SUPPRESSOR FOR FILL VALVE

[75] Inventor: David Nichols-Roy, Escondido, Calif.

[73] Assignee: Hunter Plumbing Products

[21] Appl. No.: 08/960,761

[22] Filed: Oct. 30, 1997

Related U.S. Application Data

[62] Division of application No. 08/720,636, Oct. 2, 1996, Pat. No. 5,715,859.

[51] Int. Cl.⁶ ................................................ F16K 47/02
[52] U.S. Cl. ......................... 137/436; 137/426; 137/547; 137/550; 138/42; 251/121; 251/127
[58] Field of Search .................................. 137/414, 426, 137/436, 437, 547, 549, 550; 138/42, 44, 118; 251/120, 121, 126, 127

[56] References Cited

U.S. PATENT DOCUMENTS

| | | | |
|---|---|---|---|
| 1,086,260 | 2/1914 | Abelis | 251/127 |
| 1,163,370 | 12/1915 | Ryan | 251/127 |
| 1,461,039 | 7/1923 | Leslie | 251/127 |
| 1,571,604 | 2/1926 | Ryan | 251/126 |
| 1,737,233 | 11/1929 | Griffiths | 251/126 |
| 1,843,462 | 2/1932 | Scott | 251/127 |
| 2,619,122 | 11/1952 | Hunter | 137/436 |
| 3,534,830 | 10/1970 | Kaila | 137/436 |
| 3,692,064 | 9/1972 | Hohnerlein et al. | 138/42 |
| 3,729,142 | 4/1973 | Rangel-Garza et al. | 138/42 |
| 4,338,964 | 7/1982 | Schoepe | 251/126 |
| 4,574,826 | 3/1986 | Johnson | 137/2 |
| 4,589,688 | 5/1986 | Johnson | 285/12 |
| 4,646,779 | 3/1987 | Johnson | 137/426 |
| 4,765,363 | 8/1988 | Pi-Yu | 137/414 |
| 4,945,944 | 8/1990 | Chen | 137/403 |
| 5,255,703 | 10/1993 | Johnson | 137/428 |
| 5,280,803 | 1/1994 | Swift et al. | 137/414 |
| 5,287,882 | 2/1994 | Mikol | 137/410 |
| 5,337,781 | 8/1994 | Johnson | 137/434 |
| 5,421,361 | 6/1995 | Johnson | 137/414 |
| 5,439,025 | 8/1995 | Johnson | 137/426 |
| 5,715,859 | 2/1998 | Nichols-Roy | 137/426 |

*Primary Examiner*—George L. Walton
*Attorney, Agent, or Firm*—Micheal H. Jester

[57] ABSTRACT

An adjustable height fill valve assembly for controlling water level in a storage tank, comprises a lower riser assembly comprising concentrically disposed inlet riser and an outer riser housing, each having an upper end and a lower end, the inlet riser and the riser housing connected together at the lower ends, the inlet riser being adapted for mounting in a hole in a flush tank, an upper riser assembly comprising concentrically disposed inner supply tube and an outer tubular valve housing, each having an upper end and a lower end, a main valve seat at the upper end of the inner supply tube, the upper riser assembly telescopically mounted on the lower riser assembly, a latch between the riser housing and the tubular valve housing for latching the upper and the lower riser assemblies in selected extended and retracted positions, the latch disengageable upon rotation of the upper riser assembly in either direction from a central position, a valve housing cap having a bayonet lock connection for quick connect detachable connection to an upper end of the tubular valve housing, a pilot operated main diaphragm valve mounted in the valve housing cap and engageable with the valve seat for controlling flow of water into the valve housing from the supply tube, a pressure control chamber in the housing cap above the main diaphragm valve in communication with the inlet tube, a vent port having a vent valve seat in the housing cap for venting the pressure chamber, a unitary float and float arm pivotally mounted on the cap and having a vent valve member mounted thereon for engaging the vent valve seat for closing the vent port.

21 Claims, 8 Drawing Sheets

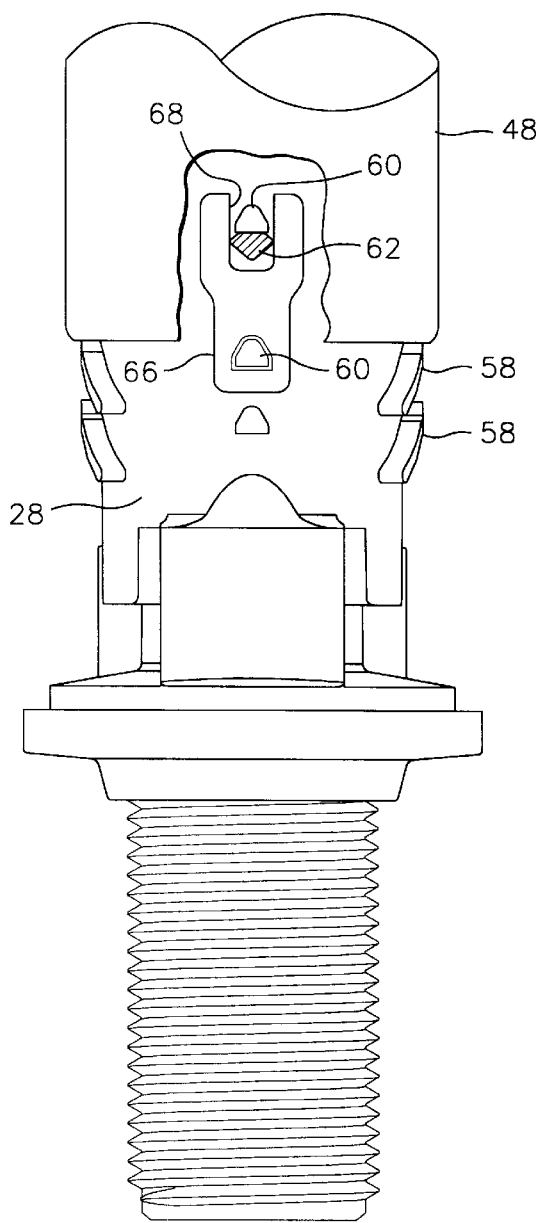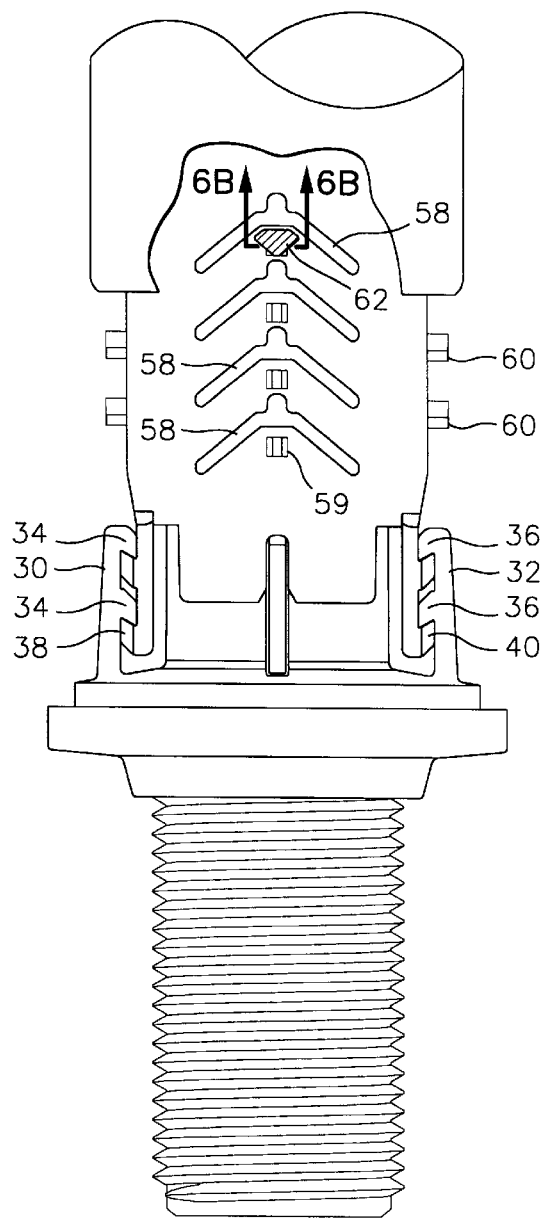
FIG. 7
FIG. 6A
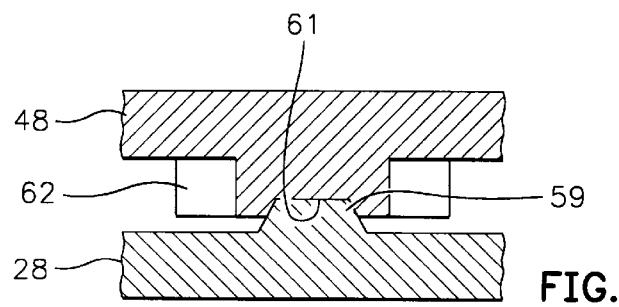
FIG. 6B

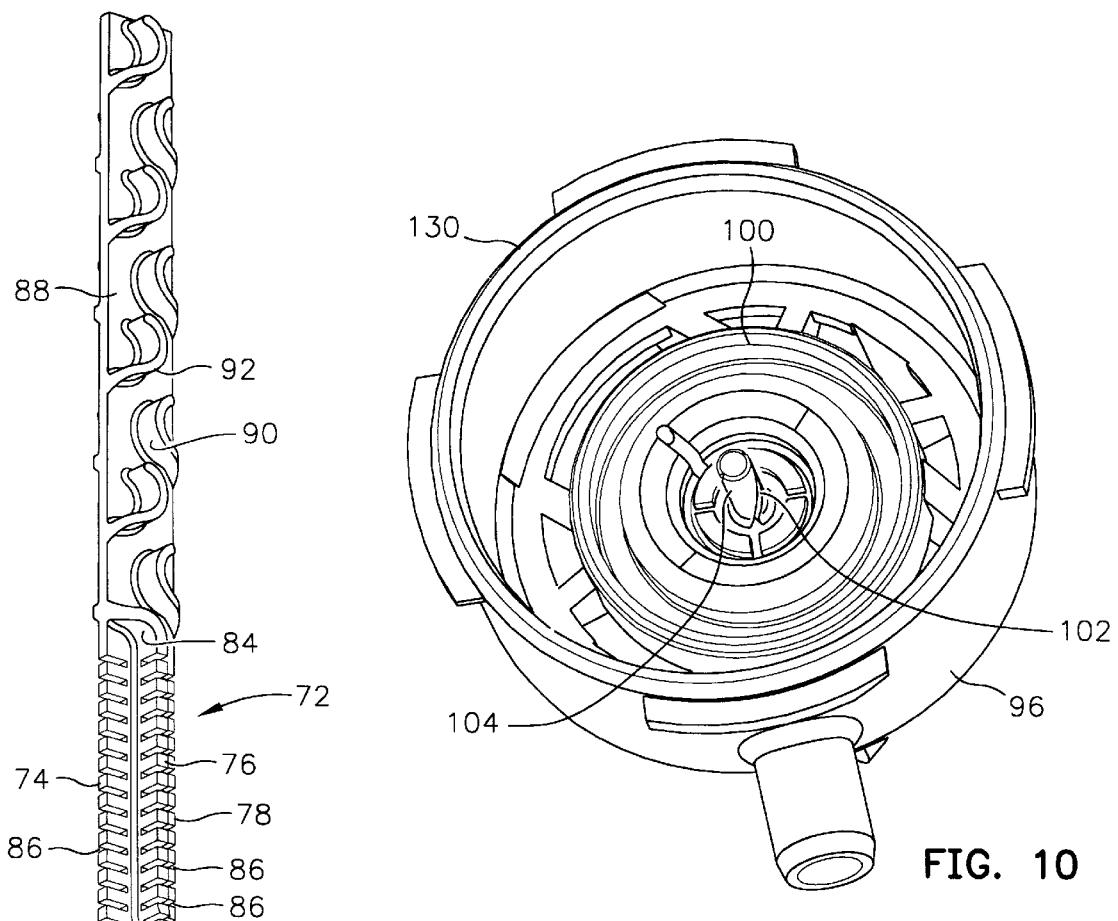
FIG. 8
FIG. 10
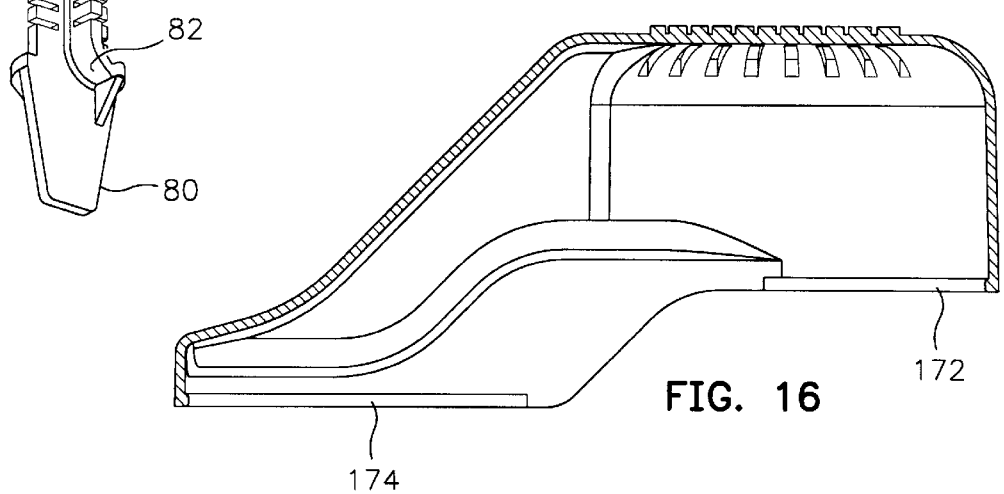
FIG. 16

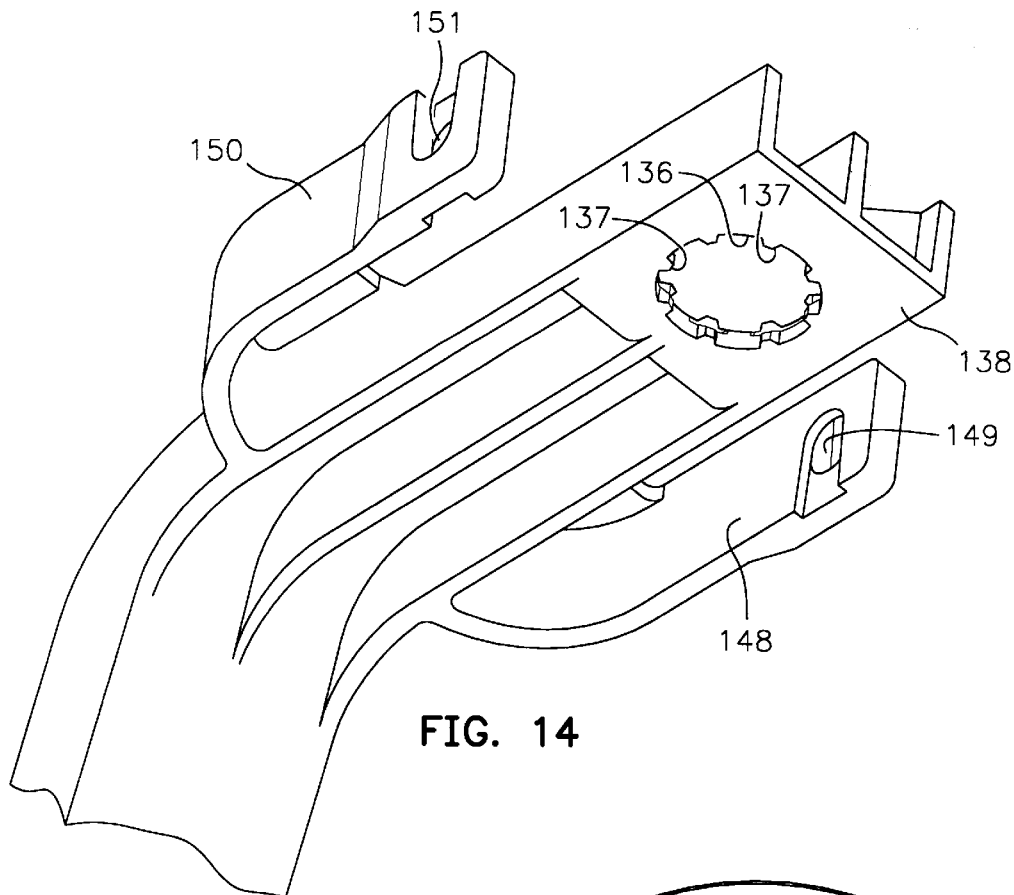
FIG. 14
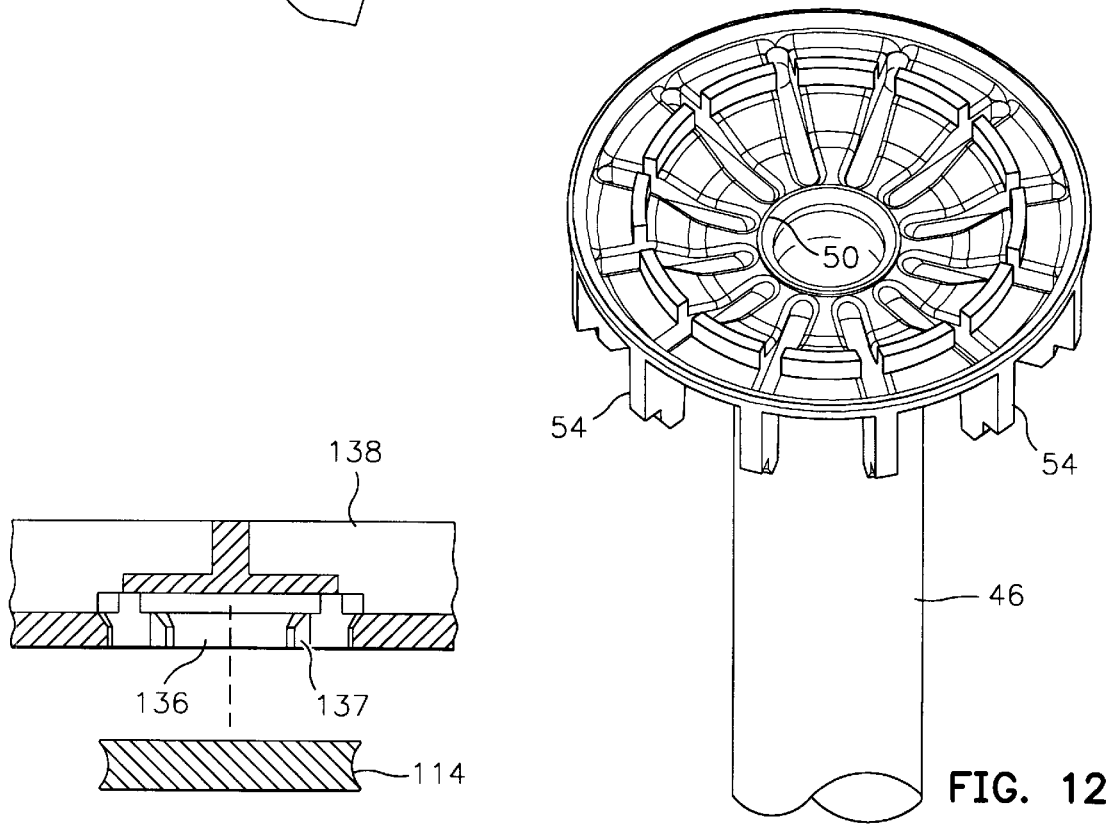
FIG. 15
FIG. 12

COMBINED FILTER AND NOISE SUPPRESSOR FOR FILL VALVE

This application is a division of application Ser. No. 08/720,636, filed Oct. 2, 1996, now U.S. Pat. No. 5,715,859.

BACKGROUND OF THE INVENTION

The present invention relates to plumbing apparatus, and pertains more particularly, to an improved adjustable fill valve assembly for flush systems used in gravity flush toilets.

Conventional toilets typically employ a generally rectangular porcelain tank mounted immediately above a porcelain bowl from which from a quantity of water is rapidly drained in order to flush waste from the bowl into the sewer system. One very common design uses a flapper valve made of an elastomeric material that normally covers the drain outlet of the tank. When the flush handle on the outside of the tank is manually depressed the flapper valve is lifted and the head of water in the tank drains through the drain outlet into the bowl, thereby flushing the contents of the bowl into the sewer system. The flapper valve is designed with an inverted air chamber so that it initially floats as it is lifted away from the drain outlet in the bottom of the tank. This allows sufficient flushing water to flow into the bowl even if the user immediately releases the flush handle. When the water level in the tank drops, it is automatically refilled through a fill valve connected to a high pressure water supply line.

The typical fill valve for the tank comprises a ballcock valve mounted in the tank on top of a riser which extends through an opening in the bottom of the tank and is connected to a pressurized water line in the house. When the tank drains, a float connected to the ballcock valve descends. This activates the ballcock valve and it begins to refill the tank with water at a rate much slower than the rate at which water flows through the drain outlet. When the tank is nearly empty, the flapper valve closes. The tank continues to refill as the float connected to the ballcock rises. At the same time water from the ballcock valve enters an overflow tube and refills the bowl to the normal standing water level to provide a trap seal. Once the float reaches a predetermined height indicating that the tank is full, the ballcock valve completely turns OFF.

The foregoing general conventional arrangement is still widely used today and has been modified in recent years with new designs to meet low volume (1.6 gal.) flush toilets required by regulations in many jurisdictions. These new designs may also include adjustable height valves to fit toilet designs of both the lowboy design wherein the tank is shallow and is normally molded into the toilet bowl and the low volume design having a tall or deep narrow tank. The valve is mounted on the top of the riser in a number of ways, and the riser is designed to telescope to adapt to different tank water level requirements.

One fill valve construction that has achieved acceptance and a certain amount of success is disclosed in U.S. Pat. No. 5,255,703 entitled Float Operated Fill Valve. This valve has a float chamber and is mounted on an adjustable riser which enables the height of the valve to be adjusted to fit many different tanks or reservoirs. However, it has a number of drawbacks for which improvements are desirable.

Among the drawbacks of the prior art valve is that it is constructed of many different parts including screws and bolts that require manufacture and assembly resulting in high cost. The valve body is of such height that it will not fit many of the standard toilets. The latch for the riser requires rotation in a single direction to unlatch for adjustment, frequently resulting in the necessity of loosening the riser from the mounting in the tank for adjustment. The noise suppressor is built into the supply tube resulting in a large valve head. The base riser is a multiple concentric tube that is difficult and expensive to mold within reasonable tolerances, and has a mounting flange that is a separate part. A separate press fit sleeve which retains the O-ring is subject to inlet pressure, often failing the press fit and causing leakage. It also has a connection to the moveable tube (with press fit sleeve . . .) that is subject to failure. Another drawback is that it has a strainer or screen mounted in the bottom of the riser, requiring removal of the supply line under the tank to remove and clean the screen. A diffuser is incorporated into the downstream of the supply tube which makes it large and complex to mold. A pilot fluid restriction pin subjects the main valve disc to uneven wear to slow shut off of the water. The float is separate from the lever and requires a separate and large float chamber which requires a large amount of head space in the tank. The pilot seat is expensive and hard to install on the lever.

Accordingly it is desirable that an improved fill valve assembly be available to overcome the above and other problems of the prior art.

SUMMARY OF THE INVENTION

It is the primary object of the present invention to provide an improved fill valve apparatus for overcoming the above problems of the prior art.

It is another object of the present invention to provide a simple less complicated and less expensive fill valve for overcoming the above problems of the prior art.

In accordance with a primary aspect of the present invention, a flush tank fill valve assembly, comprises an elongated adjustable height tubular riser having a quick connect to a main valve housing at the upper end and a threaded lower end adapted to be mounted in a bottom of a flush tank, and for connecting to a source of water, a pilot operated diaphragm fill valve including a vacuum break valve adapted to quick connect mount on said upper end of said riser, and an elongated strainer adapted to mount in said riser from above, a unitary combined float and arm assembly, and said riser being adjustable with limited rotation of the upper riser relative in either direction to the lower or fixed riser.

BRIEF DESCRIPTION OF THE PREFERRED EMBODIMENTS

The above and other objects and advantages of the present invention will be apparent from the following description when read in conjunction with the accompanying drawings wherein:

FIG. 6a is a detailed view, with portions cut away showing details of connection between the inlet riser, the riser housing and the valve housing;

FIG. 6b is a view taken of line 6—6 of FIG. 6;

FIG. 7 is a view like FIG. 6 and/but rather through from a ninety degree position;

FIG. 8 is a perspective elevation view of a combined strainer and noise suppressor.

FIG. 10 is a perspective view of the inside face of the valve housing cap;

FIG. 12 is a top perspective view of the supply tube showing details of the main valve chamber;

FIG. 14 is a detailed perspective view of the pilot valve mounting recess;

FIG. 15 is an enlarged exploded view in section of the pilot valve disc and mounting recess; and FIG. 16 is a side elevation section view of the valve cover.

DETAILED DESCRIPTION OF THE PREFERRED EMBODIMENTS

Figure 1:
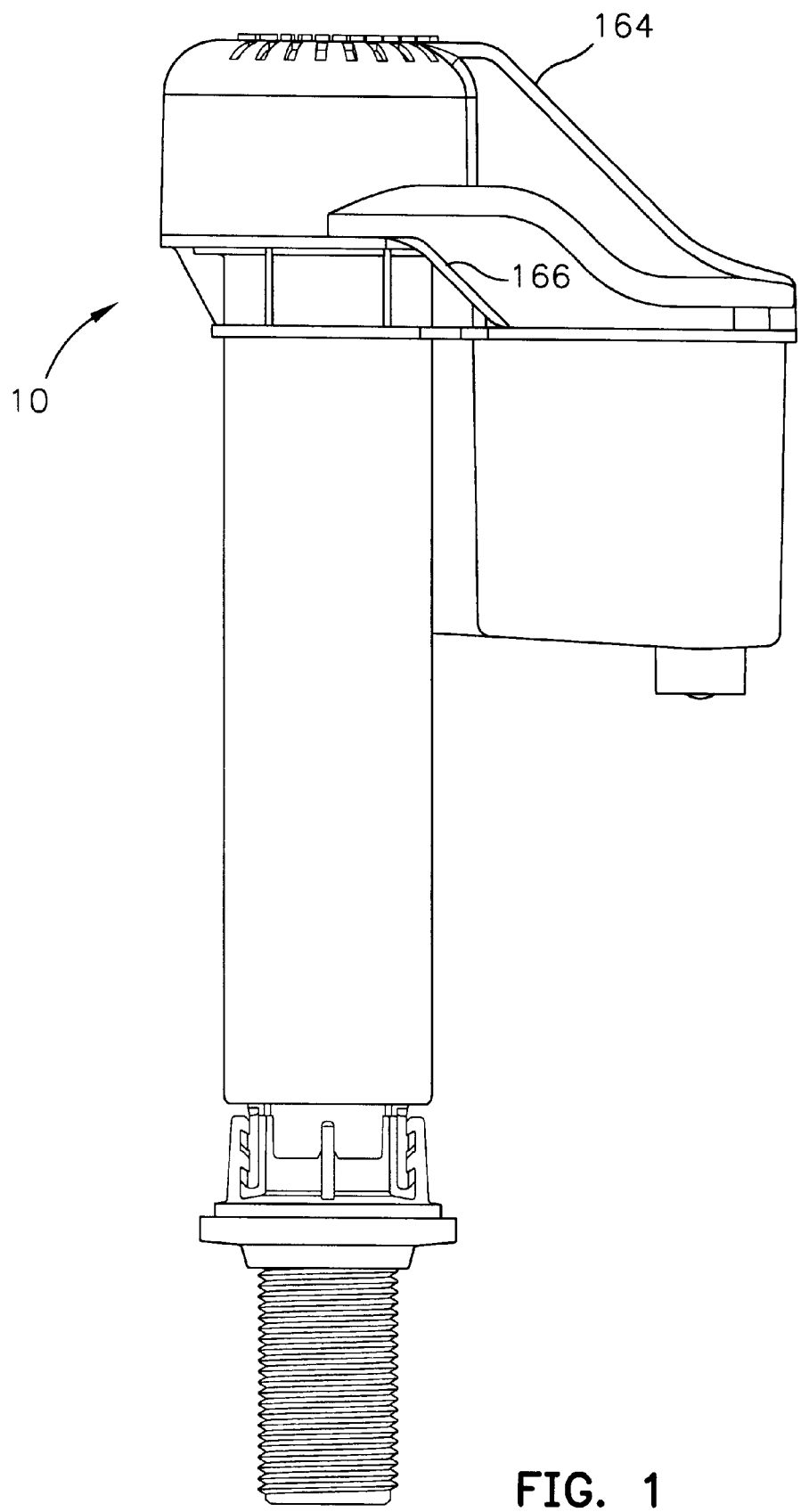
FIG. 1 is a side elevation section view of a refill apparatus in accordance with a preferred embodiment of the invention.

Referring to the drawings, particularly FIG. 1, there is illustrated a fill valve apparatus in accordance with the preferred embodiment of the invention designated generally by the numeral 10. The overall refill valve 10 comprises an improvement over refill valves of the type generally disclosed and covered in U.S. Pat. No. 5,255,703, granted Oct. 26, 1993 to Dwight N. Johnson and incorporated herein by reference as though fully set forth. The valve is designed to simplify construction, assembly and operation and is of a compact construction with a telescoping riser designed to fit a wide variety of flush tanks currently available. While the valve was designed and constructed for specific application to toilet flush tanks, it may be used in many other applications to maintain a liquid level in a wide variety of storage tanks.

Figure 2:
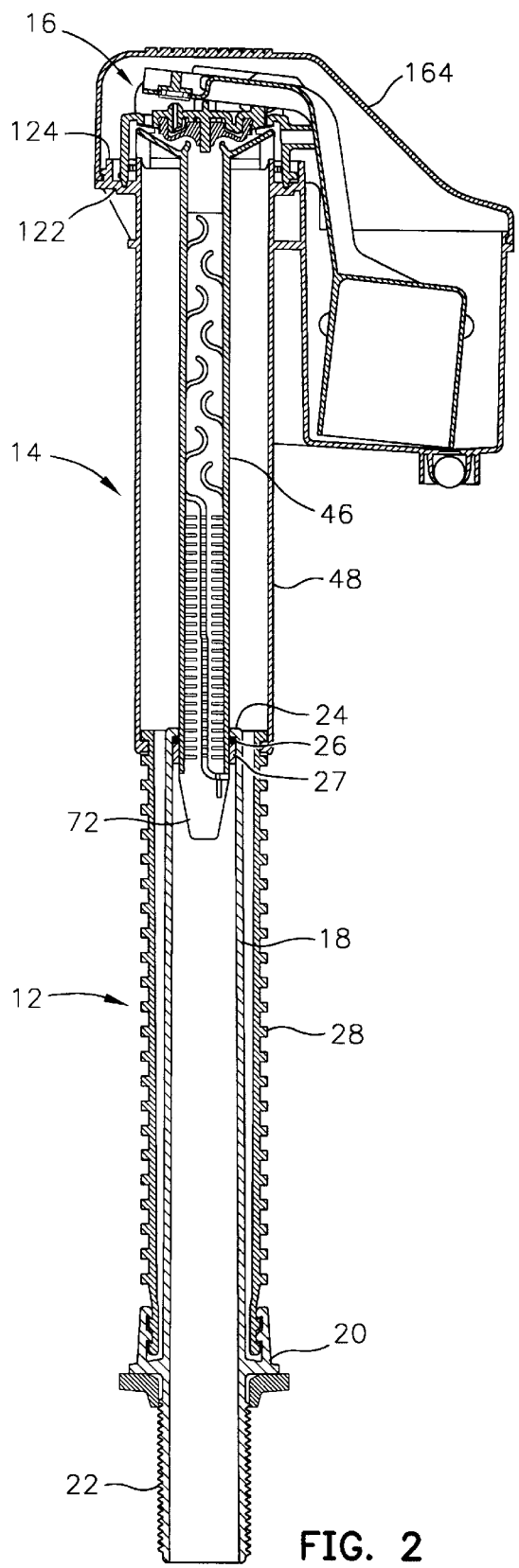
FIG. 2 is a side elevation view like FIG. 1 in section showing the valve adjusted to its highest level.
Figure 3:
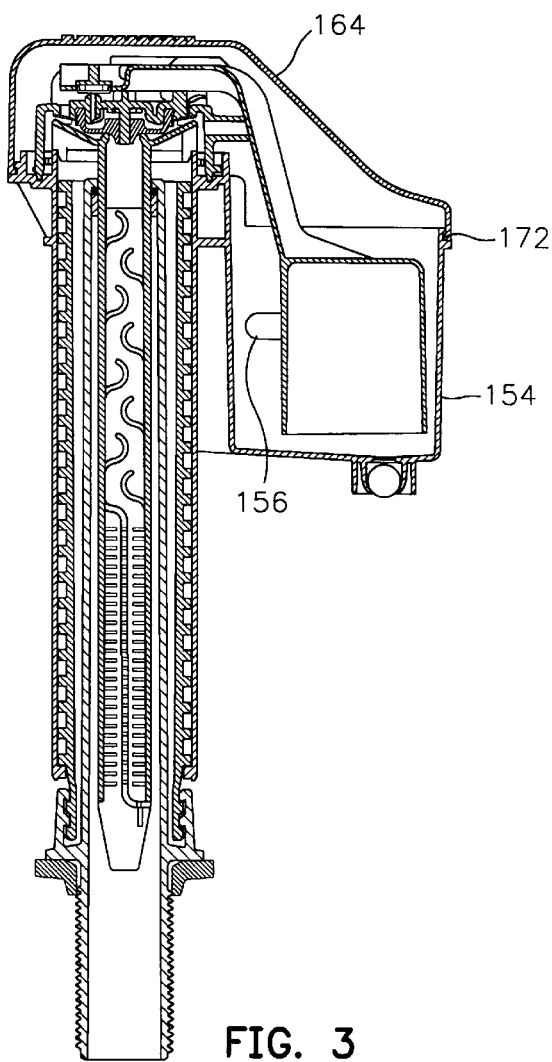
FIG. 3 is a side elevation view like FIG. 1 in section showing the valve adjusted to its lowest level.

Referring to FIGS. 2 and 3, the fill valve comprises a lower riser assembly 12, an upper riser assembly 14 which is telescopically mounted on the lower riser assembly and a main control valve 16 mounted on the upper end of the upper riser assembly 14. The lower riser assembly comprises concentrically disposed inlet riser 18 and an outer riser housing 28, each having an upper end and a lower end. The inlet riser and the riser housing are constructed as separate parts and connected together at their lower ends with a permanent snap coupling. The inlet riser is formed with a sealing flange and adapted for mounting in a hole in a flush tank.

The lower riser assembly comprises an inner inlet riser tube 18 having a radial flange 20 at the lower end thereof for mounting engagement with the walls or bottom of a fluid tank and a threaded nipple or end 22 for connecting to a source of pressurized water. The upper end of the inlet riser 18 includes an inwardly directed flange or shoulder 24 for capturing and retaining an O-ring 26 in place against pressurized water inside the riser tube. A retainer ring 27 is preferably inserted in the inlet riser 18 below the O-ring. Water pressure in the riser tube acts on the retainer ring 27 and helps keep the O-ring in place in the upper end of the tube and in sealing engagement with the inlet tube 46. With this construction, there is no retainer sleeve at the upper end of the riser to blow off as in the prior art.

Figure 4:
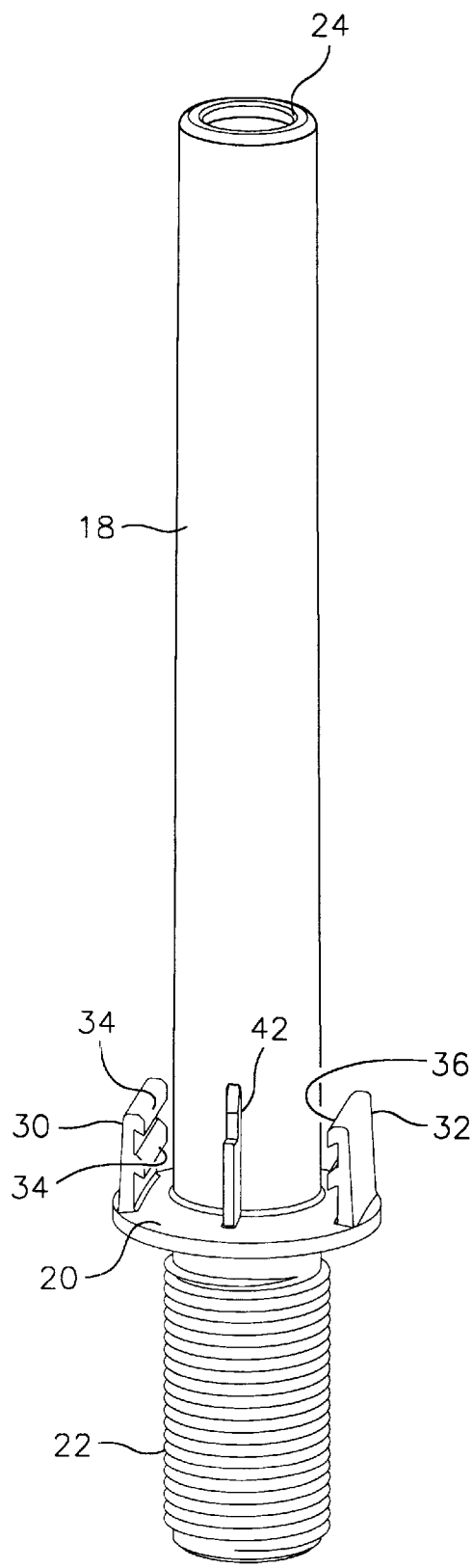
FIG. 4 is a perspective elevation view of an inlet riser of the invention.
Figure 5:
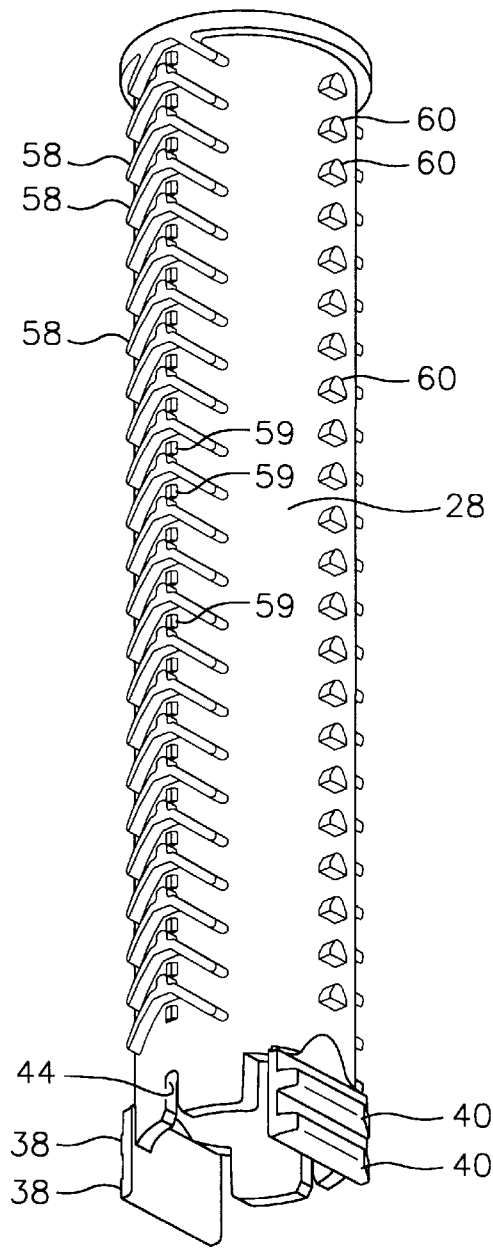
FIG. 5 is a view like FIG. 5 of the riser housing.

The outer tube or riser housing 28 is constructed separately from the inlet riser 18 to eliminate distortion normal in the molding process so that a uniformity of wall thickness and spacing can be maintained in both of the tubes. The riser housing 28 and the inlet riser 18 are secured together by a locking assembly at the lower end thereof which comprises a pair of upwardly directed fingers 30 and 32 as shown in FIG. 4, each having a pair of transverse downward directed latching bars 34 and 36. These engage similar upwardly directed latching bars 38 and 40 on the lower end of the riser housing, as shown in FIG. 5.

The inlet riser as best seen in FIG. 4, includes a guide rib 42 which registers with a guide slot 44 in the lower end of the riser housing 28. This properly orients the inlet riser and riser housing as they are assembled and snapped together as the riser housing is forced down on the inlet riser into the locked position. This, for all practical purposes, permanently locks the two members together.

Figure 9:
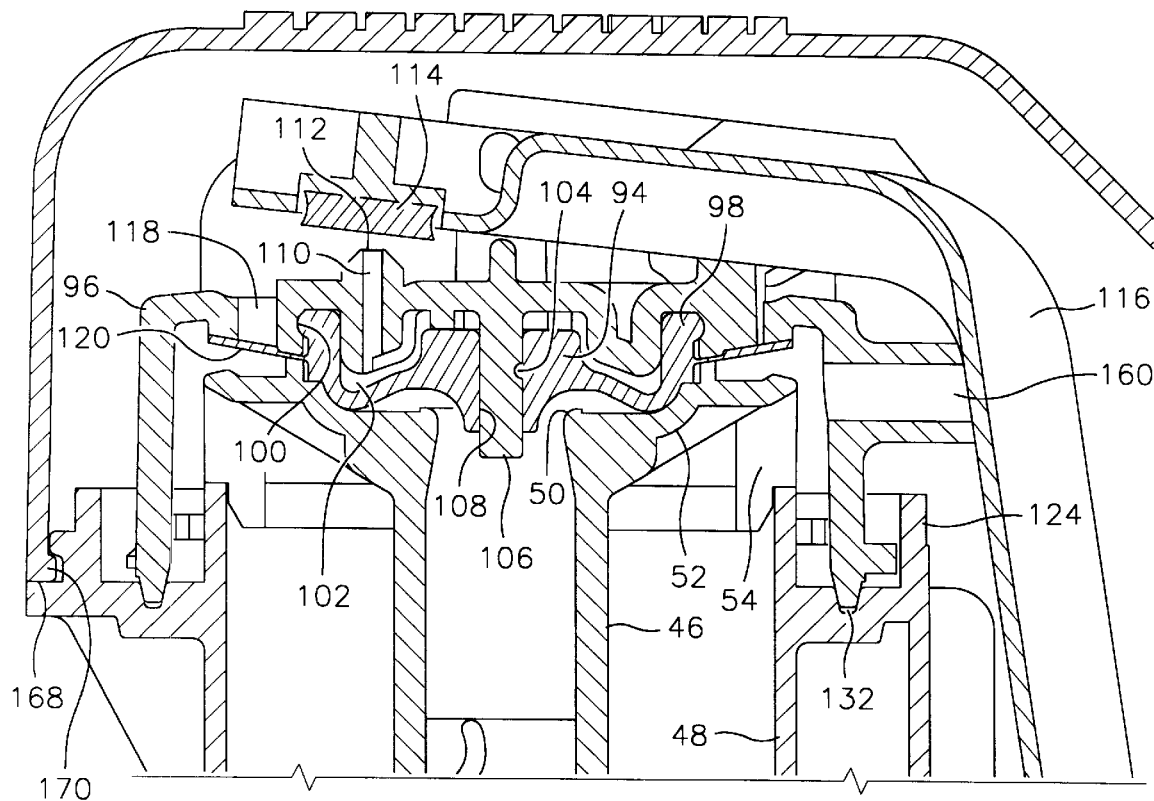
FIG. 9 is an enlarged detailed view in section of the valve.
Figure 13:
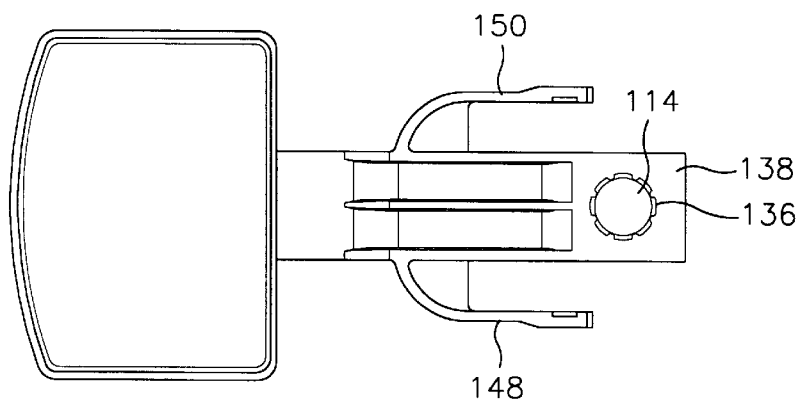
FIG. 13 is a bottom plan view of the float and arm.

The upper riser assembly, as illustrated in FIG. 2 and 3, comprises a supply tube 46 which is concentrically disposed within a tubular valve housing 48 and the assembly of these tube members are telescopically mounted on the lower riser assembly. The O-ring 26 sealingly engages the outer surface of supply tube 46 and is captured by the inwardly directed flange 24 and the retainer ring 27. The supply tube 46 is inserted into the inlet riser 18 and the valve housing 48 fits over the riser housing 28. The supply tube 46 has an annular valve seat 50 formed at the upper end and an upwardly sloping radial flange or housing wall 52 just slightly below the seat 50 and having downwardly depending support/guide ribs 54 engaging an upper peripheral edge of the valve housing 48, as seen in FIG. 9. The surface 52 is provided with a plurality of slots forming passages for water to flow down, into the space between the supply tube and valve housing into the storage tank.

The upper and lower riser assemblies are telescopically mounted with respect to each other and are extendable and retractable, as shown in FIG. 2 and FIG. 3 to maximum and minimum heights. The height, as will be subsequently explained, determines the fluid or liquid level in the storage tank. An interlocking latch assembly including a detent mechanism is formed between the valve housing 48 and the riser housing 28.

Referring to FIG. 5, the riser housing is formed on its outer surface with two vertical rows of inverted substantially V-shaped latch or retaining ridge or detent members 58 extending from the lower or bottom end thereof to the upper or top end thereof. The riser housing is preferably formed with two rows of such retaining members on opposite sides of the outer surface thereof. The riser housing is also formed with two rows of stop members 60 disposed on opposite sides of the outer surface thereof, between the two rows of retaining ridges 58.

Referring to FIGS. 6a and 7, the inner surface of the valve housing 48 is provided with four lugs or studs 62 disposed in a line around the circumference of the valve housing at the lower end thereof. The detent studs 62 carried by the valve housing 48 can move in either direction upon rotation of the valve housing into or out of a space, as shown in FIG. 6a, between a pair of retaining ridges 58. The retaining ridges are provided with a rounded projection 64 at the apex thereof so that the stud 62 snaps into the center or locked position as shown in FIG. 6a. Simultaneously, with the movement of one stud 62 into a latching or locking position as shown in FIG. 6 (gauge) an adjacent detent stud 62 moves into an abutting relation with a stop projection or stud 60, as shown in FIG. 7. Thus, adjustment of the riser and the valve height between any of the positions between the full height, as shown in FIG. 2, and the minimum height as shown in FIG. 3, is accomplished by grasping and rotating while pushing down the valve housing in either direction approximately 1/8 of a turn so that the latch stud 62 clears the latch ridge 58 so that the valve housing may be raised or lowered to its desired position. Upon positioning the valve at its desired height, the valve housing is then rotated back to the position for engagement of the latch stud with the latch ridge and recess, as shown in FIG. 6. The configuration of the latch mechanism insures that force on the valve housing as a result of water pressure forces the dent into the latched position.

Referring to FIG. 6b, a detent mechanism is preferably provided by a raised detent on the riser housing between the latch ridges and a recess on the inner face of the lugs 62 on the inside of the valve housing. This provides a more positive locking or latching of the riser housing and valve housing in position.

As shown in FIG. 7, the riser assembly may be locked in a desired position by means of a position lock 66 as illustrated. The position lock 66 has a somewhat open ended wrench-like configuration with a slot 68 which encompasses or extends around the stud 62 at a stop 60 with an opening 70 at the handle end 70 receiving a stop 60. This lock is inserted at the lower end of the housing 48 and has its lower end or handle exposed. The riser cannot be adjusted in height until the lock is removed.

Referring now to FIG. 8, a unique elongated combined strainer/difuser/restrictor is illustrated and designated generally by the numeral 72 which fits inside the supply tube 46, as shown in FIGS. 2 and 3. This puts it upstream of the main valve as opposed to down stream as in many prior art valves. This positioning and the smaller diameter keeps the flow passages to a minimum which keeps forces smaller. This eliminates the need for thick walled parts and provides more reliable operation.

The combined strainer/restrictor 72 is slightly tapered with an interference fit in the supply tube 46 at the lower end. The combined strainer/restrictor is formed at its lower end with a strainer section divided into a pair of inlet quadrants and a pair of outlet or collection quadrants. These quadrants are formed by four elongated longitudinal ribs or walls only three of which, 74, 76 and 78, are shown. An inlet section is formed by a lower end separating wall 80 and between ribs 74 and 76 with the rib 76 forming end walls 82 and 84, separating adjacent channels at each end of the strainer section. The strainer section is large and formed by a series of narrow rectangular slots 86 formed in each of the respective elongated longitudinal ribs. This large strainer area enables the filtering out of a large amount of debris without appreciable reduction in water flow. Water entering into the inlet channel between the ribs 74 and 76 passes upward and is stopped by upper wall 84 and forced to move through the slots 86 to an adjacent outlet channel permitting the flow of water to continue upward into the diffuser/restrictor section.

The diffuser/restrictor section is formed by a flat rectangular panel 88 provided on opposite sides with alternately directed curved walls 90 and 92 forming expansion and restriction spaces or passages therebetween. These curved walls have a somewhat C or hook configuration form flow diverters and alternately serve to lower the pressure of the liquid as it twists and turns through the tortuous path formed between the respective walls. This also reduces noise created by liquid flowing into and through the valve assembly at the upper end of the upper riser assembly. The above described construction provides a simple unit that is easily serviced from inside the tank without the need for tools. All of the necessary functions are carried out by a single part or element.

Referring now back to FIGS. 2 and 3, and forward to FIG. 9, the valve assembly designated generally at 16 comprises a pilot-operated main diaphragm valve member 94 mounted in a valve cap or housing 96 and positioned to engage the valve seat 50 at the upper end of the supply tube 46. The main diaphragm valve disc 94 is provided with an upwardly directed annular wall or mounting and sealing flange 98 having a sealing bead, as shown, which is pressed into an annular recess 100 formed in the upper valve housing or cap 96 and held by the upper surface 52 and circular ribs 55. The main valve is pilot-operated and a pressure control chamber 102 is formed between the upper surface of the valve member 94 and the central hub of the valve housing cap 96.

Inlet water pressure to the control chamber 102 is provided by way of at least one and preferably two pilot channels 104 formed in a spiral configuration on a central pin 106 which is formed on cap 96 and extends in close fit through a central through bore 108 in the center of the diaphragm valve 94. The central valve disc 94 of the main valve moves up and down around this pin as it opens and closes. In conventional straight channel construction, the wall of the bore wears all around the pin except for the channel and eventually restricts the channel and the flow through it. This spiral configuration forces the walls of the wall of the bore 108 to wear uniformly all around and avoids restriction of the channel.

Control of the pressure in chamber 102 is provided through a pilot valve comprising a pilot bore or orifice 110 formed in the valve housing cap 96 communicating between the chamber 102 and the exterior of the housing. The port is formed with an upper end formed as a valve seat 112 which is selectively engaged by a valve member disc 114 mounted in a recess in an end of a float arm 116.

A vacuum breaker valve is formed by one or more openings or passages 118 formed in the valve housing cap 96 and by a valve membrane 120 consisting of a peripheral extension of the main valve diaphragm. The main valve diaphragm extension 120 is formed as a peripheral extension of the main diaphragm valve and overlaps a plurality of openings 118 in the valve housing cap 96 for providing a vacuum break valve which opens to atmosphere and vents the pressure inlet line should a vacuum occur in that line. If a vacuum should occur, air is drawn into the valve via openings in the cover 164 and passes around valve 120 and across the outer rim of surface 52 and across valve seat 50 into and down a supply tube 46. The rim of 52 and valve seat 50 may be provided with particles to prevent an air seal. This protects the potable water supply from possible contaminated water being drawn in from the storage tank. The vacuum breaker valve membrane 120 of the main valve diaphragm is connected to the main valve diaphragm by a reduced thickness portion, as shown, which serves as a flexible hinge enabling the valve member to flex and move freely relative to the main valve diaphragm.

Figure 11:
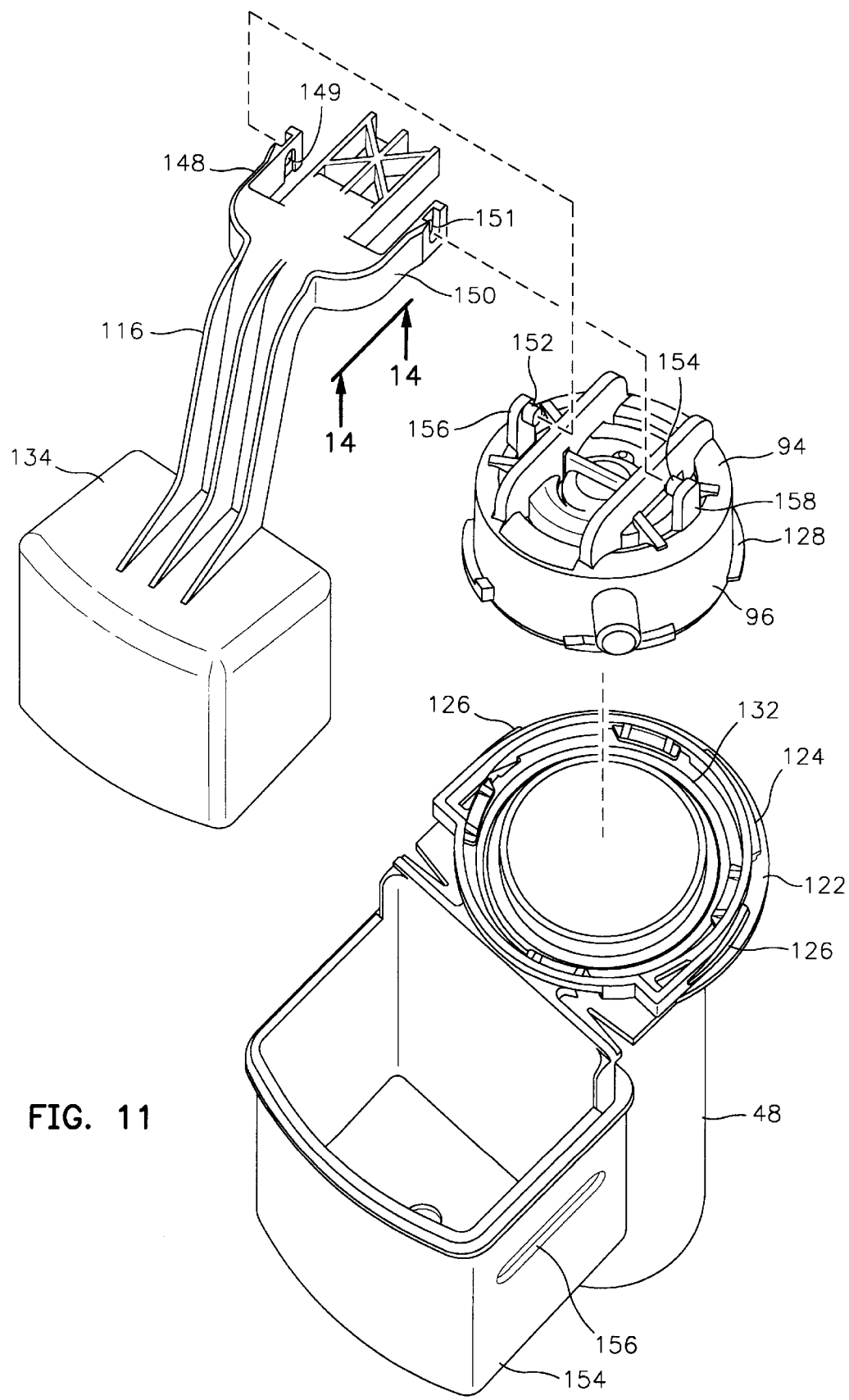
FIG. 11 is a perspective assembly view of the valve cap, valve housing and float assembly.

Referring now to FIGS. 10 and 11, the valve housing cap 96 is detachably mounted on the upper end of the tubular valve housing 48 by a bayonet-lock type connection enabling the cap to be quickly detached from the main valve housing by a quarter turn rotation. This provides easy access to the interior of the valve housing for maintenance and repair.

As shown in FIG. 11, the main valve housing 48 has a radial connector flange assembly 122 extending outward from an upper end thereof with a vertical rim or wall extension 124 having a plurality of bayonet lock connector slots 126 around the periphery thereof. The valve housing cap 96 is provided with a plurality of radially extending bayonet lock lugs or ledges 128 disposed around the lower peripheral rim thereof for selective engagement with the bayonet lock lugs or ledges 126 for securing the housing cap 96 in position on the upper end of the valve housing 48 up on limited rotation of the cap. Sealing of the valve housing cap 96 to the valve housing 48 is accomplished by a tapered lower peripheral edge 130 of the cap which engages and locks into a tapered peripheral slot 132 formed in the upper surface of flange 122.

The main control valve is controlled by means of a float-operated pilot valve. The float assembly which controls the pilot valve is a unitary construction of a float arm 116 with a float 134 which comprises an inverted box-like structure forming an air chamber on a lower most end of the float arm 116, as illustrated in FIGS. 11 and 12. The upper or other end of the arm 116 includes a recess 136 in which the pilot valve disc 114 is mounted, as illustrated in FIGS. 14 and 15. The recess 136 is generally cylindrical in configuration with inwardly extending ribs 137 having a relief or backward slope at the bottom of the recess. The valve disc 114 is made of a flexible or elastic material such as EPOM rubber. The disc is of a generally cylindrical configuration with a somewhat concave peripheral surface, as illustrated in FIG. 15. The disc is made by a stamping process from a sheet of the prescribed thickness. This forms the concave surface. The disc is thicker than the depth of the recess and is simply pressed into the recess and snaps into position.

The upper end of the float arm is formed with a main central portion 138 and a pair of laterally disposed flexible pivot arms 148 and 150 which include bores or openings 149 and 151 that latch onto pivot pins 152 and 154 formed on upwardly extending fingers 156 and 158 on top of the valve housing cap 96. The arms 148 and 150 can flex and may be squeezed inward to allow the arms to drop down over the pivot pins to engage and receive the pivot pins.

The pivot bores 149 and 151 are formed by oppositely directed overlapping slots which intersect to form the bores. This construction enables the molding of the entire assembly in a one-step process in a two-part mold.

As illustrated in FIGS. 1, 2 and 11, a float housing 154 is molded into and integral with the valve housing 48 and forms a float chamber, as shown, wherein the float is disposed in the chamber. The walls of the chamber form a dam up to a slot or opening 156 so that inlet opening 156 allows water to spill into the chamber for rapid raising of the float 134 at the shut off level.

Thus, water in the storage tank does not come into contact with the float until the water level exceeds that which guarantees a positive shut off of the pilot valve. This means the force applied by the water on the float exceeds the force of the inlet water pressure on the pilot valve. This construction provides a rather precise control of water level in the storage tank, which is critical for low volume (1.6 gal.) flush toilets.

A port 157 is controlled by a check valve 158 allows the float chamber to empty of water when the water level in the storage tank is below the bottom thereof. This delays the drop of the float until the float housing 154 is empty. This delay results in a delay in opening of the main inlet valve 16. The check valve 158 also closes and prevents the entry of water into the float chamber as the tank is being filled. Water does not enter the float housing until the water level reaches the opening 156, at which time water spills into the chamber rapidly filling it to raise the float 134. This immediately closes pilot vent orifice 110, 112 allowing pressure to build up in the pressure control chamber 102 and close the main control valve 94. This cuts off water supply to the storage tank until the tank is again emptied.

The present valve assembly is provided with a built in turn on delay in order to provide a required precise volume of water per flush regardless of the inlet water pressure. The float 134 must descend a certain amount before the pilot valve disc 114 is lifted off the seat 112 and turns on the main control valve 94. The float will not descend until a certain amount of water has left the float chamber. The drain rate of the float chamber is controlled by the size of the drain port 157. This isolates the float and allows the float to turn on the fill valve more slowly than in the prior art devices. The drain port size may be of a size that allows the main valve to turn on even after the flapper valve has closed so that water delivered to the toilet bowl is consistent regardless of water pressure. This also eliminates the need for expensive pressure or flow regulators as in many prior art systems.

When valve 94 is open inlet water flow by way of inlet supply tube 46 is allowed to pass radially outward from the valve seat spilling over the edge and flowing down into the space between the fill tube or supply tube 46 and the valve housing 48 to pass into and fill the tank. A certain amount of water is allowed to flow by way of outlet 160 and a flexible refill tube to flow into the overflow tube in the fixture to fill the trap.

The overall valve assembly as shown in FIG. 1 has a low profile with the float housing resting or positioned below the valve assembly. As seen in FIGS. 2 and 3, the float arm has a generally L-shaped configuration extending horizontally outward at the top and then downwardly, close to a 90 degree angle, to the float in its float housing. A single cover member 164 as shown in FIGS. 1–3 and 16, covers both the valve and the float housing or chamber. The cover snaps into place and includes finger tabs at opposite sides only one of which 166 is shown at one side of the housing to be grasped to unlatch the cover.

As best seen in FIGS. 2 and 3 and in FIG. 9, a groove 168 is formed at the juncture of the flange 122 and wall 124 with a latching ridge 170 formed at the bottom edge of the cover 164 to latch into the valve housing. A similar groove 172 is formed partially around the upper edge of the float housing with a ridge 174 formed around the lower part of the covered portion extending around the float housing. Thus, the cover can be easily removed simply by grasping the finger tabs 166 and pulling upward/outward to release the latch ridge from its groove.

The top valve housing cap 96 is easily removed from the upper end of the valve housing member 48 by rotating it approximately ⅛ to ¼ turn. Once the valve housing cap is removed, the fill tube 18 can be lifted out of the valve housing 48. The combined strainer and restrictor 72 can then be removed from the bottom of the fill tube 18 by grasping the finger tab at the lower end thereof and pulling it axially out of the fill tube 18. The bore of the fill tube and the outer surface of the strainer/restrictor are preferably slightly tapered with the strainer/restrictor having a slightly larger diameter at the lower end thereof for an interference fit such that it is frictionally retained in place. Thus, the strainer/restrictor can be easily removed, cleaned and replaced.

The present valve assembly can be completely assembled and disassembled without the need for wrenches and screwdrivers. The entire assembly eliminates screws and bolts as extensively used in the prior art. Similarly, the assembly is constructed of a minimum number of parts to thereby eliminate its expense and complexity.

While I have illustrated and described my invention by means of specific embodiments, it is to be understood that numerous changes and modifications may be made therein without departing from the spirit or scope of the invention, as defined in the appended claims.

I claim:

1. A combined strainer and noise suppressor for use in combination with a fill valve of the type for mounting on an upper end of a riser for controlling water level in a storage tank, comprising:

an elongated member adapted for removably mounting in a bore of a riser, said elongated member having an inlet end and an outlet end, said inlet end defined by longitudinally and radially extending walls having narrow slots therein, said walls forming a pair of inlet quadrants and a pair of outlet quadrants extending from said inlet end toward said outlet end, a combined diffuser and restrictor section communicating and extending from said outlet quadrants to said outlet end.

2. An apparatus according to claim 1 wherein said combined diffuser and restrictor section includes a series of oppositely directed curved walls defining a tortuous path.

3. An apparatus according to claim 2 wherein said combined diffuser and restrictor section includes a longitudinally extending planar wall dividing said section into two sectors and said series of oppositely directed curved walls are on opposite sides of said planar wall.

4. An apparatus according to claim 3 wherein said oppositely directed curved walls have a generally C shape and extend from opposite side edges of said planar wall.

5. An apparatus according to claim 3 wherein said combined diffuser and restrictor sections and said strainer section each extend about half way from opposite ends of said member.

6. An apparatus according to claim 5 wherein said oppositely directed curved walls have a generally C shape and extend from opposite side edges of said planar wall.

7. An apparatus according to claim 1 wherein said combined diffuser and restrictor section and said strainer section each extend about half way from opposite ends of said member.

8. An apparatus according to claim 7 wherein said combined diffuser and restrictor section includes a longitudinally extending planar wall dividing said section into two sectors and said series of oppositely directed curved walls are on opposite sides of said planar wall.

9. An apparatus according to claim 8 wherein said combined diffuser and restrictor section includes a series of oppositely directed substantially hook shaped curved walls defining a tortuous path.

10. An apparatus according to claim 1 further comprising a valve housing member including an inlet supply tube and said combined strainer and noise suppressor are removeably mounted in said supply tube, said supply tube having a proximal end and a distal end and restriction means in said proximal end for retaining said combined strainer and noise suppressor in place against an incoming flow of water.

11. An apparatus according to claim 10 wherein said combined diffuser and restrictor section includes a longitudinally extending planar wall dividing said section into two sectors and a series of oppositely directed curved walls are on opposite sides of said planar wall defining a tortuous path.

12. An apparatus according to claim 11 wherein said oppositely directed curved walls have a generally hook shape and extend from opposite side edges of said planar wall.

13. An apparatus according to claim 12 wherein said combined diffuser and restrictor sections and said strainer section each extend about half way from opposite ends of said member.

14. A combined strainer and noise suppressor for use in combination with a fill valve including;

an inlet supply tube and said combined strainer and noise suppressor are removeably mounted in said supply tube, said supply tube having a proximal end and a distal end and restriction means in said proximal end for retaining said combined strainer and noise suppressor in place against an incoming flow of water, comprising:

an elongated member adapted for removeably mounting in a bore of a riser, said elongated member having an inlet end and an outlet end, said inlet end comprising a strainer section defined by longitudinally extending walls having narrow slots, said walls forming a pair of inlet quadrants and a pair of collector quadrants extending from said inlet end toward said outlet end, said outlet end defined by a combined diffuser and restrictor section including a series of oppositely directed curved walls defining a tortuous path communicating with and extending from said collector quadrants to said outlet end.

15. An apparatus according to claim 14 wherein said combined diffuser and restrictor section includes a longitudinally extending planar wall dividing said section into two sectors and said series of oppositely directed curved walls are on opposite sides of said planar wall.

16. An apparatus according to claim 15 wherein said oppositely directed curved walls have a generally C shape and extend from opposite side edges of said planar wall.

17. An apparatus according to claim 16 wherein said combined diffuser and restrictor sections and said strainer section each extend about half way from opposite ends of said member.

18. An apparatus according to claim 15 wherein said oppositely directed curved walls have a generally hook shape and extend from opposite side edges of said planar wall.

19. A combined strainer and noise suppressor for use in combination with a fill valve having a housing including an inlet riser assembly, the valve comprising an elongated inner riser and supply tube having an upper end, a lower end, and having a main valve seat at said upper end, said inner supply tube being adapted for mounting in a storage tank and connection to a source of water, a valve housing cap adapted for detachable connection to said upper end of said valve housing, a main valve diaphragm mounted in said valve housing cap and engageable with said valve seat for controlling flow of water into said valve housing from said supply tube, a pressure control chamber in said housing cap between said main valve diaphragm valve and said housing cap, the strainer and noise suppressor, comprising:

an elongated member having an inlet end and an outlet end adapted removeably mounting in said inner riser and supply tube, said inlet end comprising a strainer defined by longitudinally extending walls having narrow slots dividing said inlet end into a pair of inlet quadrants and a pair of collector quadrants, a combined diffuser and restrictor section communicating with and extending from said collector quadrants to said outlet end.

20. An apparatus according to claim 19 wherein said combined diffuser and restrictor section includes a series of oppositely directed curved walls defining a tortuous flow path.

21. An apparatus according to claim 20 wherein:

said combined diffuser and restrictor sections and said strainer section each extend about half way from opposite ends of said member; and said oppositely directed curved walls have a generally hook shape and extend from opposite side edges of said planar wall.

* * * * *